No. 777,320. PATENTED DEC. 13, 1904.
F. URBAN.
PHOTOGRAPHIC OBJECTIVE.
APPLICATION FILED JUNE 9, 1904.
NO MODEL.

WITNESSES:
Percy Mayer
Edna La Gay

Inventor
FRANZ URBAN
By Dickerson, Brown, Raegener & Binney
his attys

No. 777,320.

Patented December 13, 1904.

UNITED STATES PATENT OFFICE.

FRANZ URBAN, OF STEGLITZ, NEAR BERLIN, GERMANY, ASSIGNOR TO THE FIRM OF OPTISCHE ANSTALT C. P. GOERZ AKTIENGESELL-SCHAFT, OF FRIEDENAU, NEAR BERLIN, GERMANY.

PHOTOGRAPHIC OBJECTIVE.

SPECIFICATION forming part of Letters Patent No. 777,320, dated December 13, 1904.

Application filed June 9, 1904. Serial No. 211,730. (No model.)

*To all whom it may concern:*

Be it known that I, FRANZ URBAN, optician, a citizen of the German Empire, residing at Steglitz, near Berlin, Germany, have invented a new and useful Improvement in and Relating to Photographic Objectives, of which the following is a specification.

This invention relates to improvements in photographic objectives; and it consists more particularly in a spherically, astigmatically, chromatically, and comatically corrected four-lens objective.

In the new objective the spherical, astigmatical, and chromatical correction is obtained in a substantially known manner by including a lens of arbitrary character between two lenses of the opposite character, forming with the first-mentioned lens one collective and one dispersive surface. In order to obtain at the same time comatical correction, I divide one of the two outer lenses in said known combination into two lenses of the same character—that is to say, into two positive lenses when the original lens was positive and into two negative lenses when the original lens was negative—choosing such kinds of glass for the two elements of the compound lens that the surface between the element lenses has collective property and a curvature opposite to that of the collective surface already present in the system as above stated. The effect of the compound lens consisting of two lenses of the same character is substantially the same as the effect of one single lens of the same character, with the sole difference that the collective surface between the lens elements of opposite curvature to the other collective surface of the system gives a means to counteract the dispersive surface present in the system. This last-named surface is the principal reason of the comatical fault of the system by its subjecting the marginal rays of a pencil of inclined incidence to different degrees of deflection.

The four forms in which the objective modified according to the present invention can be constructed are illustrated in the annexed drawings by means of central vertical sections.

Figure 1:
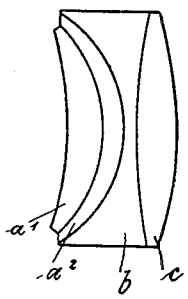
Figure 2:
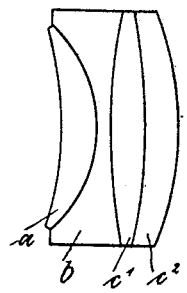

Figures 1 and 2 represent the two forms of the objective in which one of the two outer positive lenses shown in Fig. 1 of the drawings annexed to the Patent No. 528,155 is replaced by two positive lenses. In Figs. 1 and 2 of the annexed drawings the central negative lens is indicated by $b$. In Fig. 1 a single positive lens $c$ is shown on the right-hand side of the negative lens, as in Fig. 1 of the drawings annexed to the previous patent cited; but the lens shown in the latter on the left-hand side is replaced by two positive lenses $a'$ and $a^2$. In Fig. 2, on the other hand, a single positive lens $a$ is placed on the left-hand side of the central negative lens; but two positive lenses $c'$ and $c^2$ instead of a single positive lens are placed on the right-hand side of the central lens.

In the objective shown in Fig. 1 the cement surfaces between the lenses $a'$ $a^2$, on the one hand, and between the lenses $b$ and $c$, on the other hand, are collective, whereas the cement surface between the lenses $a^2$ and $b$ is dispersive.

In the objective shown in Fig. 2 the cement surface between the lenses $b$ and $c$ and that between the lenses $c'$ and $c^2$ are collective, and the cement surface between the lenses $a$ and $b$ is dispersive. In each case the collective cement surfaces are of opposite curvature.

Figure 3:
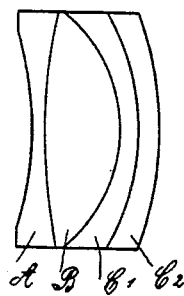
Figure 4:
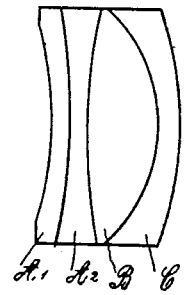

Figs. 3 and 4 illustrate those forms of the objective in which two negative lenses are used in place of one of the outer negative lenses shown in Fig. 2 of the drawings annexed to the previous patent cited. In the said Figs. 3 and 4 the central positive lens is represent by B. In Fig. 3 the lateral negative members are represented by A and C' and $C^2$, respectively, and in Fig. 4 by A', $A^2$, and C', respectively. In Fig. 3 the collective cement surfaces are between the lenses A and B and the lenses C' and $C^2$, the dispersive cement surface being between the lenses B and C'. In Fig. 4 the collective cement surfaces are between the lenses A' and $A^2$ and the lenses $A^2$ and B, the dispersive surface being between the lenses B and C. In each of the said Figs. 3 and 4 the collective cement surfaces are therefore of opposite curvature.

The improved objective can be used either as a single objective or as a double objective. Coma being corrected, the objective is in the form of a single objective particularly well adapted to be used in a set—that is to say, in combination with an objective or objectives of a similar kind having a different focal length or focal lengths for the purpose of varying the focal lengths of the combination by combining different objectives of the set.

Having now particularly described and ascertained the nature of my said invention and in what manner the same is to be performed, I declare that what I claim is—

The spherically, chromatically, astigmatically and comatically corrected photographic objectives built up of four lenses having cemented faces, and comprising a lens of arbitrary character, inclosed between lenses of the opposite character whereof one is double, forming a collective surface between its elements, and the other single, the refractive power of each of the individual lenses contacting with opposite sides of the first-mentioned lens being different from the refractive power of the lens with which it contacts and the contacting surfaces being one dispersive and the other collective, the collective one having opposite curvature to the collective surface between the elements of the said double lens.

In testimony whereof I have signed this specification in the presence of two subscribing witnesses.

FRANZ URBAN.

Witnesses:
 HENRY HASPER,
 WOLDEMAR HAUPT.